(12) United States Patent
Decapua

(10) Patent No.: US 6,439,258 B1
(45) Date of Patent: Aug. 27, 2002

(54) QUICK-CLOSE TANK VENT CONTROL SYSTEM

(75) Inventor: Dennis Decapua, Greenfield, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/914,186
(22) PCT Filed: Mar. 1, 2000
(86) PCT No.: PCT/US00/05188
§ 371 (c)(1), (2), (4) Date: Aug. 22, 2001
(87) PCT Pub. No.: WO00/52368
PCT Pub. Date: Sep. 8, 2000

Related U.S. Application Data

(60) Provisional application No. 60/122,284, filed on Mar. 1, 1999.

(51) Int. Cl.[7] .............................................. F16K 24/04
(52) U.S. Cl. ......................................... 137/202; 137/43
(58) Field of Search ................................... 137/43, 202

(56) References Cited

U.S. PATENT DOCUMENTS 3,727,629 A * 4/1973 Gifford ........................ 137/202
4,655,238 A * 4/1987 Szlaga ........................... 137/43
5,449,029 A * 9/1995 Harris ........................... 137/202

* cited by examiner

Primary Examiner—Gerald A. Michalsky
(74) Attorney, Agent, or Firm—Barnes & Thornburg

(57) ABSTRACT

A tank vent control system includes a valve container adapted to be mounted in a vehicle fuel tank and formed to include an interior chamber, a chamber inlet, a chamber outlet, and a valve positioned to move up and down in the interior chamber to control the flow of liquid fuel and fuel vapor from the interior chamber through the chamber outlet. The valve includes an outlet closure sized to engage and close the chamber outlet and an exterior wall. The valve container includes a lower interior portion bounding a lower region of the interior chamber and surrounding the exterior wall of the valve to define a vent passage therebetween communicating with the chamber inlet. The valve container also includes an upper interior wall bounding an upper region of the interior chamber and engaging the exterior wall of the valve upon movement of the valve to a snap-closure position to allow formation of pressure differential between the lower and upper regions of the interior chamber so that the valve is assisted in moving quickly to a closed position closing the chamber outlet.

17 Claims, 4 Drawing Sheets

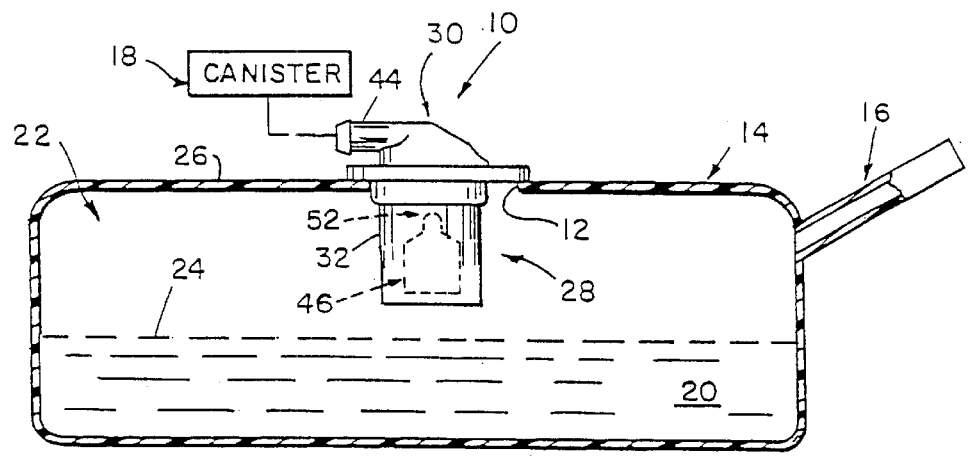
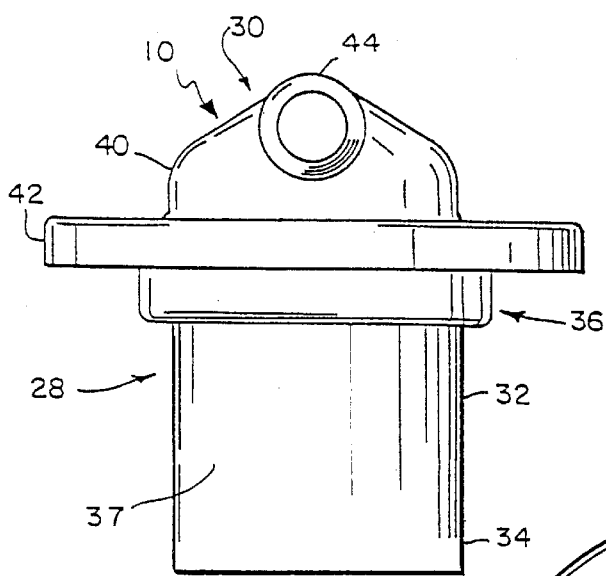
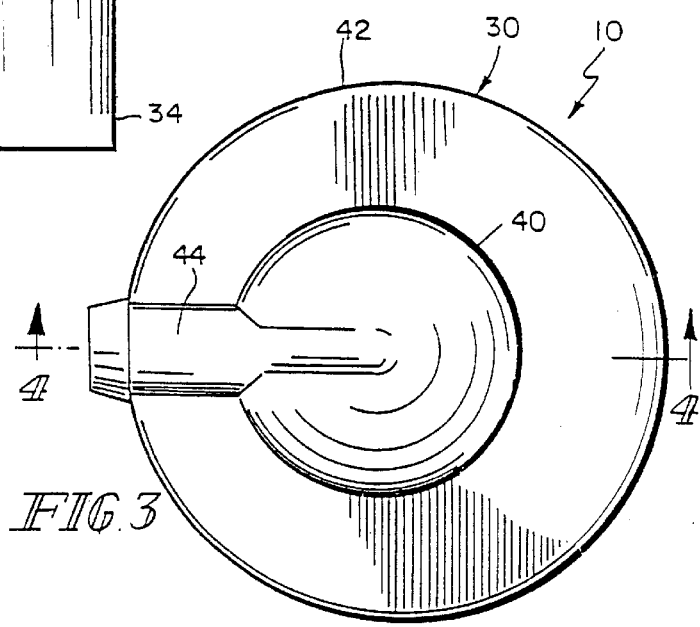

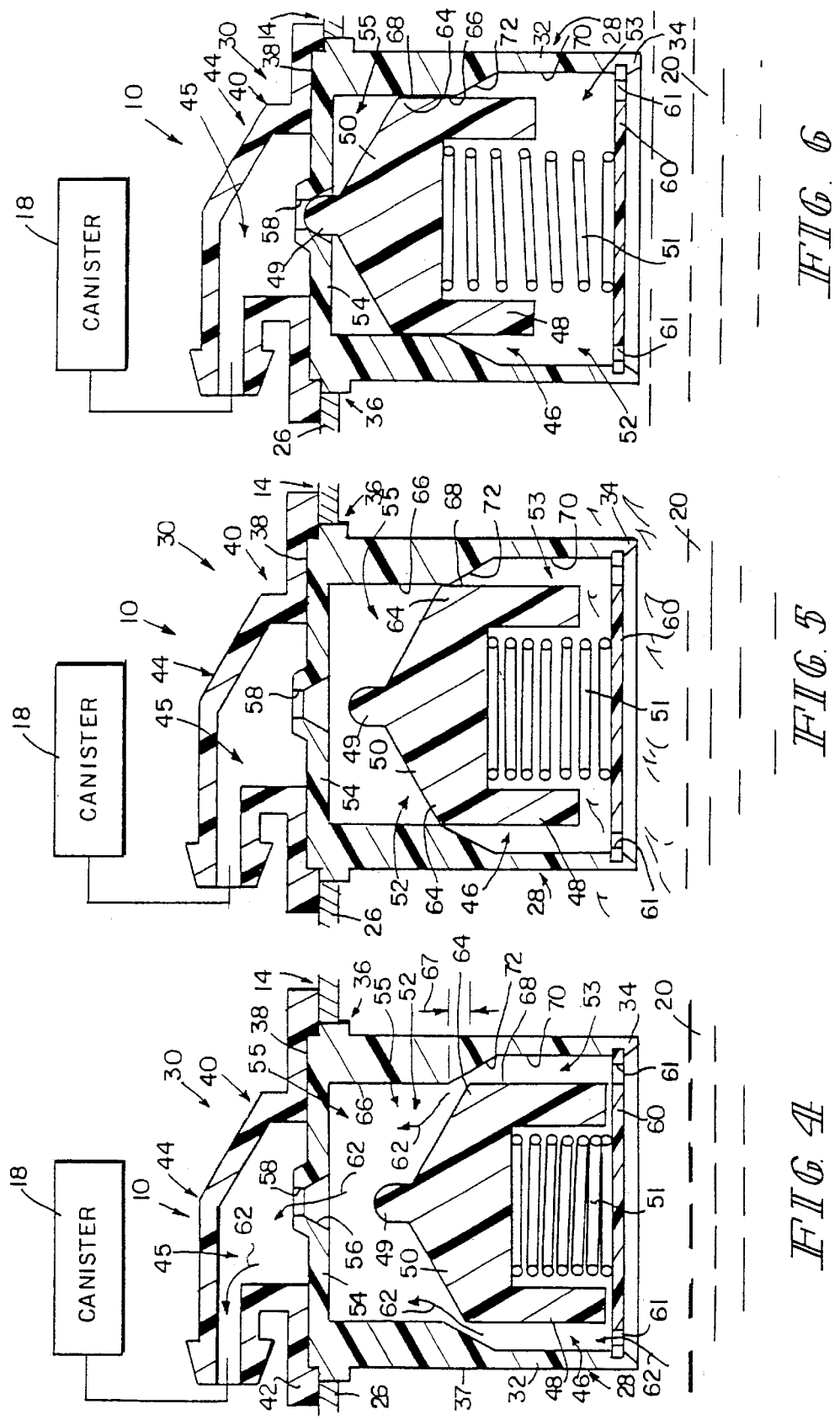

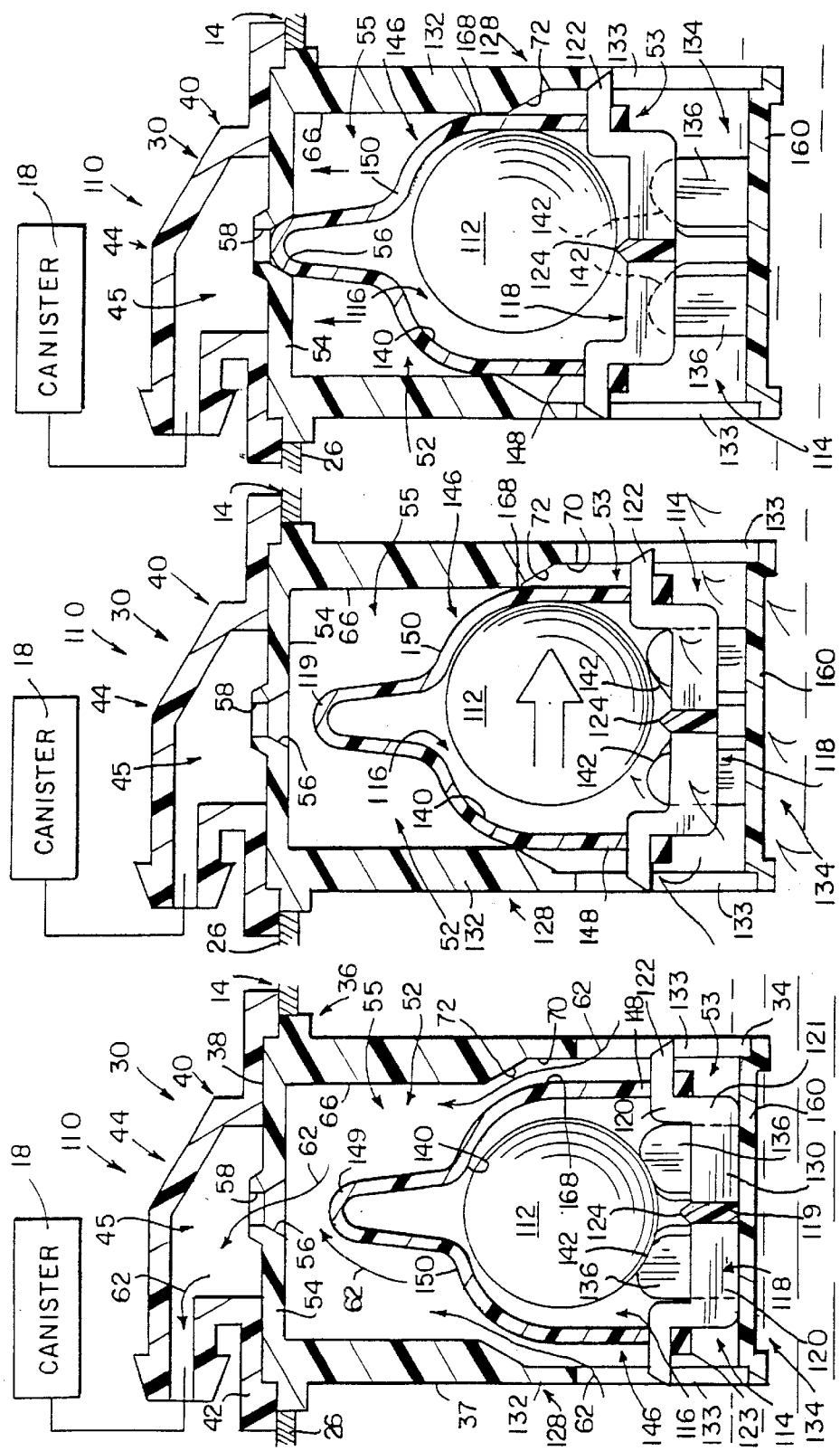

US 6,439,258 B1

QUICK-CLOSE TANK VENT CONTROL SYSTEM

This application is the national stage of International Application Ser. No. PCT/US00/05188 filed Mar. 1, 2000, which claims the benefit of U.S. Provisional Application Ser. No. 60/122,284 filed Mar. 1, 1999.

BACKGROUND AND SUMMARY OF THE INVENTION

The present invention relates to tank pressure control systems, and particularly, to apparatus for regulating discharge of liquid fuel and fuel vapor from a fuel tank. More particularly, the present invention relates to tank venting control apparatus that closes quickly and automatically at the proper moment to prevent discharge of agitated liquid fuel from the tank and overfill of the tank.

During vehicle cornering and dynamics, the liquid fuel inside a vehicle fuel tank is often agitated to cause the liquid fuel to move with a splashing motion inside the vehicle fuel tank. Liquid fuel can also be sloshed about in a vehicle fuel tank in response to other types of vehicle motion in addition to vehicle cornering.

Vehicle fuel tanks include vent apparatus for regulating discharge of liquid fuel and fuel vapor from the interior region of the fuel tank. Such a vent apparatus is often mounted in an aperture formed in a top wall of the vehicle fuel tank and could be exposed to agitated liquid fuel that is sloshed about inside the vehicle fuel tank during cornering or other movement of the vehicle.

According to the present invention, a tank vent control system includes a valve container and a valve movable in an interior chamber formed in the valve container to open and close a chamber outlet formed in the valve container. The valve regulates flow and discharge of pressurized fuel vapor admitted into the interior chamber through a chamber inlet coupled to a vehicle fuel tank. In an opened position of the valve, an exterior wall of the valve cooperates with an interior wall of the valve container to define a vent passage to conduct pressurized fuel vapor through the interior chamber from the chamber inlet to the chamber outlet. In a closed position of the valve, an outlet closure included in the valve is positioned to close the chamber outlet.

As the valve is moved upwardly in the interior chamber due to rising liquid fuel levels and/or tilting of the valve container, the valve reaches a "snap-closure position" located between the opened and closed positions. At this point, the exterior wall of the valve engages an upper interior wall defining a boundary of the interior chamber to partition the interior chamber into a lower region communicating with the chamber inlet and containing pressurized fuel vapor from the vehicle fuel tank and an upper region communicating with the atmosphere through the chamber outlet. Once the interior chamber is partitioned, a "pressure differential" is established between the lower and upper regions owing to admission of pressurized fuel vapor (from the fuel tank) into the lower region and development of relatively low-pressure atmospheric conditions (from the atmosphere) in the vented upper region. A "lifting force" is applied to the valve as a result of this pressure differential to assist in moving the valve quickly from the snap-closure position to the closed position while the pressure extant in the lower region of the interior chamber is higher than the pressure extant in the upper region of the interior chamber.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a diagrammatic view of a tank venting control apparatus in accordance with the present invention mounted in a fuel tank containing liquid fuel and having a filler neck;

FIG. 2 is a side elevation view of the tank venting control apparatus of FIG. 1 showing the apparatus including a container lid and a valve container;

FIG. 3 is a top plan view of the tank venting control apparatus of FIG. 2 showing the container lid including a closure shell and an output tube;

FIG. 4 is a sectional elevational view of the tank venting control apparatus of FIGS. 1–3 taken along line 4—4 of FIG. 3 showing a float member in a lowered position inside an interior chamber of the valve container to allow fuel vapor in the fuel tank to pass through the valve container and around the float member to exit through a tank venting outlet coupled to the output tube;

FIG. 5 is a view similar to FIG. 4 showing some upward movement of the float member during fuel sloshing in the fuel tank to move an upper corner or edge of the float member into engagement with an interior wall defining a reduced-diameter upper region in the interior chamber of the valve container without moving the float member to close the tank venting outlet above the float member so that the reduced annular flow area results in reduced vapor flow past the float member;

FIG. 6 is a view similar to FIG. 5 showing further upward movement of the float member to close the tank venting outlet in response to exposure of the base of the float member to a pressure that is greater than the pressure in the reduced-diameter upper region in the interior chamber of the valve container;

FIG. 7 is a sectional elevational view similar to FIG. 4 of a tank venting control apparatus in accordance with another embodiment of the invention showing a ball-assisted closure member in a lowered position inside the interior chamber of a valve container to allow fuel vapor in the fuel tank to pass through the valve container and around the ball-assisted closure member to exit through a tank venting outlet coupled to an outlet tube of the tank venting control apparatus;

FIG. 8 is a view similar to FIG. 7 showing some upward movement of an inertia ball positioned inside the ball-assisted closure member during lateral acceleration of the vehicle containing the fuel tank to move a shoulder of the ball-assisted closure member into engagement with an interior wall defining a reduced-diameter upper region in the interior chamber of the valve container without moving the ball-assisted closure member to close the tank venting outlet above the ball-assisted closure member so that the reduced annular flow area results in reduced vapor flow past the float member;

FIG. 9 is a view similar to FIG. 8 showing further upward movement of the ball-assisted closure member to close the tank venting outlet in response to exposure of the base of the ball-assisted closure member to a pressure that is greater than the pressure in the reduced-diameter upper region in the interior chamber of the valve container;

DETAILED DESCRIPTION OF THE DRAWINGS

Figure 10:
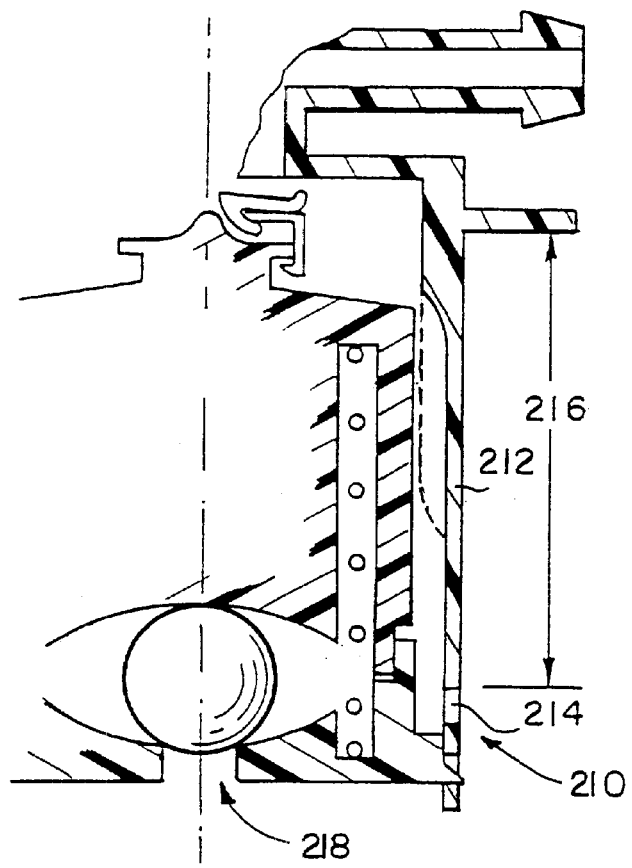
FIG. 10 is a sketch of another tank venting control apparatus in accordance with the present invention.

A valve assembly 10 is mounted in an aperture 12 formed in a fuel tank 14 having a filler neck 16 as shown in FIG. 1 to regulate flow of liquid fuel and fuel vapor from tank 14 to a vapor treatment canister 18 or other destination outside tank 14. It is within the scope of this disclosure to mount valve assembly 10 inside the fuel tank 12 and couple valve assembly 10 to canister 18 or other outside destination using a tube that is positioned to extend into the fuel tank 12 through an aperture formed in a wall of the fuel tank and coupled to valve assembly 10.

Tank 14 contains liquid fuel 20 that is introduced into the tank 14 through filler neck 16 using a conventional fuel-dispensing pump nozzle (not shown). The space 22 in tank 14 above top surface 24 of liquid fuel 20 and below top wall 26 of tank 14 is known as the "vapor space" and contains fuel vapor extant in tank 14. Valve assembly 10 operates to vent pressurized fuel vapor from vapor space 22 at the proper time and also operates to block unwanted discharge of liquid fuel 20 and fuel vapor from tank 14 through the aperture 12 formed in top wall 26 of tank 14.

As shown in FIGS. 1–4, valve assembly 10 includes a valve container 28 and a container lid 30 configured to mount on top of valve container 28. Valve container 28 includes a cylindrical sleeve 32 having an annular lower rim 34, an annular upper rim 38, and an annular side wall 37. Container lid 30 includes a closure shell 40, an annular mounting flange 42 depending from closure shell 40, and an output tube 44 coupled to closure shell 40 and formed to include output passageway 45. Annular mounting flange 42 of container lid 30 is configured to be coupled to annular upper rim 38 of valve container 28 and to a portion of top wall 16 of tank 14 around aperture 12. Valve assembly 10 can be welded in place to tank 14 or coupled to tank 14 using an O-ring seal (not shown) or other suitable seal.

Valve assembly 10 includes a buoyant float member or valve 46 having a base 48, an outlet closure nipple 49, and a dome 50 supporting nipple 49 above base 48. The float member 46 is sized to fit into and move up and down in an interior chamber 52 formed in valve container 28 as shown, for example, in FIGS. 4–6 to control flow of liquid fuel and fuel vapor from chamber 52 formed in valve container 28 through chamber outlet 58 into output passageway 45 formed in container lid 30.

Valve container 28 includes a ceiling 54 arranged to overlie chamber 52 and formed to include a conical valve seat 56 defining a tank-venting chamber outlet 58 communicating with interior chamber 52 and output passageway 45. Valve container 28 also includes a base 60 that is coupled to annular lower rim 34 of cylindrical sleeve 32 and arranged to lie in a float member-supporting position underneath the movable float member 46 as shown in FIG. 4. Chamber 52 has a large-diameter lower region 53 housing float member base 48 and communicating with vapor space 22 in tank 14 through, for example, chamber inlet apertures 61 formed in base 60. Chamber 52 also has a smaller-diameter upper region 55 receiving outlet closure nipple 49 and communicating with output passageway 45 in container lid 30 through chamber outlet 58. As shown in FIG. 4, fuel vapor 62 extant in tank 14 is able to flow to vapor treatment canister 18 through valve assembly 10 along a passage defined by chamber inlet apertures 61 in base 60, large-diameter lower region 53, smaller-diameter upper region 55, chamber outlet 58, and output passageway 45.

Float member (valve) 46 "snaps" (accelerates) quickly and automatically to a closed position when (1) lifted partially upwardly by liquid fuel 20 sloshing about in the fuel tank 14 and by spring 51 as shown in FIG. 5 and then (2) exposure of float member base 48 to a pressure extant in the large-diameter lower region 53 in chamber 52 that is greater than the pressure extant in the smaller-diameter upper region 55 in chamber 52 and around the dome 50 and outlet closure nipple 49 as shown in FIG. 6. In the closed position shown in FIG. 6, outer closure nipple 49 of float member 46 engages conical valve seat 56 to block flow of liquid fuel 20 and fuel vapor 62 through chamber outlet 58. Float member 46 will remain in the closed position, due to exposure of float member 46 to a pressure differential, so long as a sufficient pressure differential is extant in lower and upper regions 53 and 55 in interior chamber 52.

Referring now to FIG. 5, it will be seen that liquid fuel 20 sloshing in tank 14 during, e.g., vehicle cornering, is able to pass into large-diameter lower region 53 in valve container 28 through, for example, chamber inlet apertures 61 in base 60. This sloshing fuel 20 is able to lift buoyant float member 46 upwardly (with the help of spring 51), during a first stage of tank venting outlet closure, to a position wherein a shoulder 64 formed on float member 46 engages (slips inside) an upper interior wall 66 bounding at least a portion of smaller-diameter upper chamber 55 to establish a "snap-closure" position of float member (valve) 46 in interior chamber 52 formed in valve container 28. Shoulder 64 moves upwardly a distance 67 shown in FIG. 4 to reach the snap-closure position shown in FIG. 5. Shoulder 64 includes an annular exterior wall 68 that slips inside against annular upper interior wall 66 during movement of float member 46 relative to sleeve 32 of valve container 28 between the positions shown in FIGS. 5 and 6. The reduced flow area between walls 66, 68 is sufficient to allow formation of a pressure differential between lower region 53 and upper region 55 in interior chamber 52 during sloshing of liquid fuel 20 in tank 14.

Once float member (valve) 46 has been moved to the snap-closure position shown in FIG. 5 by sloshing liquid fuel 20 and spring 51, float member 46 engages valve container 28 (e.g., engagement of shoulder 64 and upper interior wall 66) to partition valve container chamber 52 into large-diameter lower region 53 and smaller-diameter upper region 55. In the illustrated embodiment, the base 60, annular lower interior wall 70 of sleeve 32, and conical interior wall 72 of sleeve 32 cooperate to define large-diameter lower region 53 "below" float member 46. Also, ceiling 54 and annular upper interior wall 66 of sleeve 32 cooperate with a portion (e.g., dome 50 and outlet closure nipple 49) of float member 46 to define smaller-diameter upper region 55 "above" float member 46.

Once float member (valve) 46 has been moved to the snap-closure position shown in FIG. 5, it will move quickly to the closed position shown in FIG. 6, during a second stage of tank venting outlet closure, owing to the fact that the high pressure in large-diameter lower region 53 (as compared to the relatively lower pressure in smaller-diameter upper region 55) and the lifting force generated by spring 51 act on the underside of float member base 48 to move float member 46 upwardly toward conical valve seat 56 around chamber outlet 58. The pressure extant in smaller-diameter upper region 55 is essentially atmospheric pressure because upper region 55 is "open" to the atmosphere through output tube 44 and canister 18 while the pressure extant in large-diameter lower region 53 is determined by the pressure of fuel vapor in region during agitation and sloshing of liquid fuel 20 in tank 14. This pressure differential and the force generated by spring 51 cooperate to snap float member 46 quickly to the closed position shown in FIG. 6 to block discharge of liquid fuel 20 and fuel vapor to canister 18 through output tube 44 whenever, for example, an excessive amount of liquid fuel sloshing in tank 14 is detected by float member 46.

In another embodiment shown in FIGS. 7–9, an inertia ball 112 is positioned inside a buoyant float member (valve) 146 included in a valve assembly 110 and configured to move the float member 146 to a snap-closure position as shown in FIG. 8 in response to predetermined lateral acceleration of inertia ball of the type that often occurs during vehicle cornering and often causes sloshing of liquid fuel 20 in tank 14. Once such a first stage of tank venting outlet closure has occurred, a differential pressure in interior chamber 52 resulting from a low pressure in upper region 55 above float member 146 and a relatively higher pressure in lower region 53 below float member 146 will snap float member 146 quickly to a closed position engaging conical valve seat 56 to close chamber outlet 58 during a second stage of tank venting outlet closure as shown in FIG. 9.

As shown in FIG. 7, valve assembly 110 includes a valve container 128 formed to include an interior chamber 52 and float member 146 is mounted to move up and down in chamber 52 to close and open chamber outlet 58 formed in ceiling 54 and adjacent to conical valve seat 56 in ceiling 54. Valve container 128 also includes a sleeve 132 that is similar to sleeve 32 in FIGS. 4–6 except that sleeve 132 is formed to include several, for example four, vertical chamber inlet slots 133 arranged to lie in circumferentially spaced-apart relation around cylindrical sleeve 132 and near annular lower rim 34 of sleeve 132.

Float member (valve) 146 includes an outlet closure base 148, a nipple 149, and a dome 150 supporting nipple 149 above base 148. A ball retainer 114 is coupled to base 148 and configured to retain inertia ball 112 inside a ball chamber 116 formed inside float member 146. Ball retainer 114 includes a crisscross frame 118 having a center portion 119 and four mutually perpendicular arms 120 extending away from center portion 119. Each arm 120 includes an outer end 121 and an outwardly turned L-shaped mounting tab 122 extending upwardly therefrom for snapping into engagement with four circumferentially spaced-apart mounting holes formed in base 148 of float member 146. A tab-supporting flange 123 is provided on the exterior of base 148 underneath each mounting hole to support a mounting tab 122 extending therethrough. A raised contact surface 124 extends upwardly from center portion 119 of crisscross frame 118 to a point below the upwardmost extension of mounting tabs 122.

Valve assembly 110 further includes a valve member retainer 134 coupled to base 148 of float member 146 and arranged to extend upwardly into ball chamber 116 formed in float member 146 as shown in FIGS. 7–9. Valve member retainer 134 includes a base 160 and four integral upstanding wedge members 136 for retaining float member 146 and ball retainer 114 in chamber 52 formed in valve container 128. Base 160 includes mounting flanges 138 coupled to base 148 of float member 146.

An interior wall of dome 150 is configured to define a first inclined ramp 140 and upper ends of upstanding wedge members 136 cooperate to define a second inclined ramp 142 as shown in FIG. 7. First and second inclined ramps 140, 142 cooperate to convert radially outward movement of inertia ball 112 into axially upward movement of float member 146 from an initial position shown in FIG. 7 to the snap-closure position shown in FIG. 8 in response to lateral acceleration of inertia ball 112.

A shoulder 164 formed on float member 146 engages an upper interior wall 66 bounding at least a portion of smaller-diameter upper chamber 55 to establish the snap-closure position. Shoulder 164 includes an annular exterior wall 168 that mates with and seals against annular upper interior wall 66 during movement of float member 146 relative to sleeve 132 of valve container 28 between the positions shown in FIGS. 8 and 9. The seal between walls 66, 168 is sufficient to allow formation of a pressure differential between lower region 53 and upper region 55 during sloshing of liquid fuel 20 in tank 14. Once float member 146 has been moved to the snap-closure position shown in FIG. 8, it will move quickly to the closed position shown in FIG. 9, during a second stage of tank venting outlet closure, owing to the high pressure in lower chamber 53 "below" float member 140 as compared to the relatively lower (e.g., essentially atmospheric) pressure in upper chamber 55 "above" float member 146.

The inertia ball shown in FIG. 10 responds to lateral accelerations and moves the float member up (e.g., about one tenth of an inch) where the vapor path is "pinched" at the float shoulder causing the float member to "pop" closed. After the flow is pinched, the vapor flow rate entering the chamber above the float member is less than the vapor flow rate exiting the chamber through the orifice resulting in the depressurization of the chamber. Also, when the inertia ball rolls off its seat, a vapor flow path 218 is opened to bottom of the float member enabling a pressure differential acting on the float member to lift the float member upwardly to its vent-closing position. The pinched flow path accelerates the vapor flow velocity on the top side of the float which reduces the static pressure in a fashion similar to an airfoil. There is stagnation pressure below the float member and static pressure above the float member. Pressure (Total)=Pressure (stagnation)=Pressure (Dynamic)+Pressure (Static) where the stagnation pressure is greater than the static pressure because of the vapor velocity (dynamic pressure). The disclosure in Ser. No. 60/122,284 filed Mar. 1, 1999 is hereby incorporated by reference herein.

The formation of the valve container to include a vapor flow window 210 to assist with fuel shutoff during vehicle tank refueling is shown, for example, in FIG. 10. Reference is made to U.S. Pat. No. 5,449,029 entitled "Fill Limit Valve Assembly," which disclosure is incorporated by reference herein, for a description of the use of a vapor flow window during vehicle tank refueling. Vapor flow window 210 is, for example, a vertical slot formed in a bottom portion of the annular side wall 212 of a valve container as shown in FIG. 10. The top boundary of vapor flow window 210 is defined by a ceiling 214 provided in annular side wall 212. A first automatic nozzle shutoff will occur once the level top surface of fuel in the tank rises to a level that reaches the bottom of annular side wall 212. Vapor flow window 210 does permit some venting of fuel vapor from the vapor space to occur after the fuel level reaches the bottom of side wall 212 and will allow a pump operator to trickle fill "without penalty" until the liquid level of fuel in the tank finally rises to the level defined by window ceiling 214. Distance 216 to ceiling 214 sets this "trickle fill level."

Figure 11:
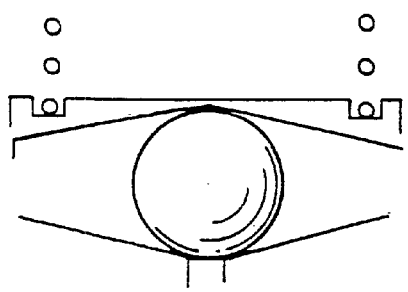
FIG. 11 is a view of an alternative spring position for use in the apparatus of FIG. 10.

In an alternate design, the spring would be perched above the inertia ball as shown in FIG. 11. This provides a benefit to the spring since it will travel with the float member until the inertia ball bottoms out.

Although the invention has been described in detail with reference to certain preferred embodiments, variations and modifications exist within the scope and spirit of the invention as described and defined in the following claims.

What is claimed is:

1. A tank vent control system comprising
   a valve container formed to include an interior chamber having a chamber inlet and a chamber outlet and adapted to be mounted in a vehicle fuel tank to vent fuel vapor from the vehicle fuel tank through the interior chamber and
   a valve positioned to lie in the interior chamber and move between an opened position venting fuel vapor from the tank through the chamber outlet via the interior chamber, a closed position closing the chamber outlet, and a snap-closure position lying therebetween, the valve including an exterior wall, the valve container including an upper interior wall positioned to define a boundary of the interior chamber and engage the exterior wall of the valve upon movement of the valve in the interior chamber from an opened position to the snap-closure position to partition the interior chamber into a lower region communicating with the chamber inlet and containing pressurized fuel vapor from the vehicle fuel tank and an upper region communicating with the atmosphere through the chamber outlet to allow formation of a pressure differential between the lower and upper regions of the interior chamber so that the valve is assisted in moving quickly from the snap-closure position to the closed position while pressure extant in the lower region is higher than pressure extant in the upper region.

2. The system of claim 1, wherein the valve container includes a lower interior wall bounding the lower region of the interior chamber and surrounding the exterior wall of the valve and the lower interior wall is positioned to lie in spaced-apart relation to the exterior wall of the valve while the valve is in the opened position to allow pressurized fuel vapor to flow through the interior chamber between the lower interior wall of the valve container and the exterior wall of the valve to reach the chamber outlet.

3. The system of claim 2, wherein the valve container includes a conical interior wall having a large-diameter inner end joining the lower inner wall and a small-diameter inner end joining the upper interior wall.

4. The system of claim 3, wherein the valve container includes a base coupled to the lower interior wall and formed to include the chamber inlet and the base, the lower interior wall, and the conical interior wall cooperate with the valve to define the lower region of the interior chamber.

5. The system of claim 1, wherein the exterior wall of the valve is annular and the upper interior wall of the valve container is annular and configured to mate with the annular exterior wall of the valve during movement of the valve in the interior chamber from the snap-closure position to the closed position.

6. The system of claim 5, wherein the valve container includes a ceiling coupled to the annular upper interior wall and formed to include the chamber outlet and the ceiling and annular upper interior wall of the valve container cooperate with a portion of the valve to define the upper region of the interior chamber.

7. The system of claim 6, wherein the portion of the valve includes an outlet closure sized to close the tank-venting outlet upon movement of the valve to the closed position and a dome coupled to the annular exterior wall of the valve and arranged to support the outlet closure in confronting relation to the chamber outlet formed in the ceiling.

8. The system of claim 1, wherein the valve container includes a lower interior wall positioned to lie adjacent to the chamber inlet and to surround the exterior wall of the valve and a conical interior wall arranged to interconnect the lower and upper interior walls and converge in a direction toward the chamber outlet.

9. The system of claim 8, wherein each of the upper interior walls of the valve container and the exterior wall of the valve is annular and sized to mate with one another in close-fitting relation during movement of the valve from the snap-closure position to the closed position.

10. A tank vent control system comprising
    a valve container adapted to be mounted in a vehicle fuel tank and formed to include an interior chamber, a chamber inlet, and a chamber outlet, and
    a valve positioned to move up and down in the interior chamber to control the flow of liquid fuel and fuel vapor from the interior chamber through the chamber outlet, the valve includes an outlet closure sized to engage and close the chamber outlet and an exterior wall, the valve container includes a lower interior portion bounding a lower region of the interior chamber and surrounding the exterior wall of the valve to define a vent passage therebetween communicating with the chamber inlet and an upper interior wall bounding an upper region of the interior chamber and engaging the exterior wall of the valve upon movement of the valve in the interior chamber toward the chamber outlet to a snap-closure position to block flow of liquid fuel and fuel vapor from the vent passage into the upper region of the interior chamber to allow formation of a pressure differential between the lower and upper regions of the interior chamber so that the valve is assisted in moving quickly to a closed position wherein the outlet closure of the valve engages and closes the chamber outlet while pressure extant in the lower region of the interior chamber is higher than pressure extant in the upper region of the interior chamber.

11. The system of claim 10, wherein the valve includes a base and a dome coupled to the base and arranged to support the outlet closure above the base and the base includes the exterior wall.

12. The system of claim 11, wherein each of the upper interior wall of the valve container and the exterior wall of the valve has an annular shape and are sized to lie in close-fitting relation one to another during movement of the valve relative to the valve container from the snap-closure position to the closed position.

13. The system of claim 11, wherein the valve container further includes a ceiling arranged to lie adjacent to the upper interior wall and to overlie the interior chamber and formed to include the chamber outlet and the ceiling, upper interior wall, dome, and outlet closure cooperate to define the upper region of the interior chamber that is exposed to the atmosphere via the chamber outlet.

14. The system of claim 10, wherein the lower interior portion of the valve container includes an annular lower interior wall positioned to lie in spaced-apart relation to the upper interior wall and a conical interior wall arranged to interconnect the lower and upper interior walls and converge in a direction toward the chamber outlet.

15. The system of claim 14, wherein the annular lower interior wall has a first interior diameter and the upper interior wall has an annular shape and a second interior diameter that is less than the first interior diameter.

16. The system of claim 15, wherein the exterior wall of the valve has an annular shape and an exterior diameter that is less than but about equivalent to the second interior diameter to establish close-fitting engagement of the exterior wall of the valve and the upper interior wall of the valve container during movement of the valve relative to the valve closure from the snap-closure position to the closed position.

17. A tank vent control system comprising a valve container adapted to be mounted in a vehicle fuel tank, the valve container including an annular lower interior wall, an annular upper interior wall, and a conical interior wall arranged to interconnect the annular lower and upper interior walls, the annular upper interior wall having an interior diameter that is less than the interior diameter of the annular lower wall, the annular lower, conical, and upper interior walls cooperating to define an interior chamber of the valve container, the valve container being formed to include a chamber inlet adapted to admit pressurized fuel vapor from a vehicle fuel tank into the interior chamber when the valve container is mounted on a vehicle fuel tank and to include a chamber outlet adapted to establish communication between the interior chamber and the atmosphere outside of the vehicle fuel tank when the valve container is mounted on a vehicle fuel tank, and a valve positioned to move up and down in the interior chamber to control flow of liquid fuel and fuel vapor from the interior chamber through the chamber outlet, the valve including a dome, an outlet closure coupled to an upper portion of the dome and sized to engage and close the chamber outlet upon movement of the valve in the interior chamber of the valve container to a closed position, and an annular exterior wall coupled to a lower portion of the dome and sized to engage the circumference of the annular upper interior wall in close-fitting relation upon movement of the valve in the interior chamber from an opened position wherein pressurized fuel vapor flows from the chamber inlet to the chamber outlet through a vent passage defined between the annular exterior wall of the valve and the annular lower, conical, and upper interior walls of the valve container to a snap-closure position wherein flow of liquid fuel and fuel vapor from the chamber inlet to the chamber outlet is blocked by engagement of the annular upper interior wall of the valve container and the annular exterior wall of the valve.

* * * * *